Oct. 30, 1956 A. B. PUTNAM 2,768,794
ROTARY BEATER BREAKING MILL FOR LOOSENED PAVEMENT SLAB
Filed April 24, 1951 2 Sheets-Sheet 1
Fig. 2
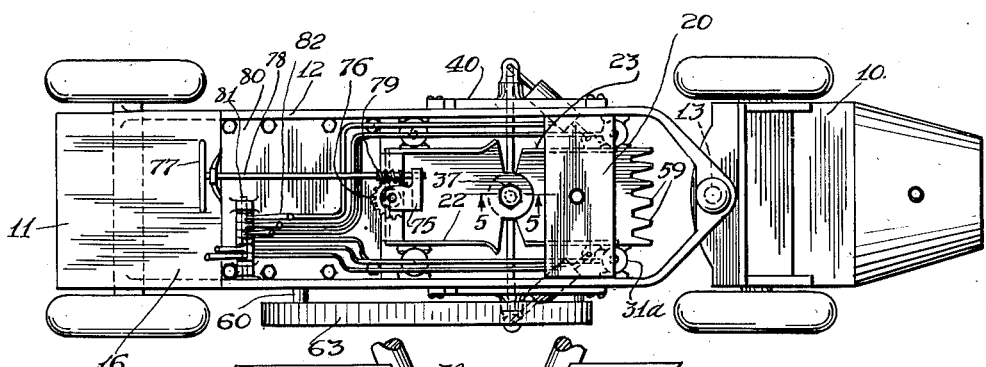
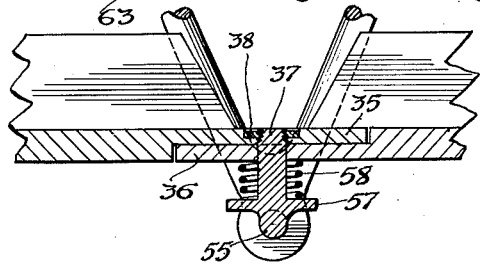
Fig. 5
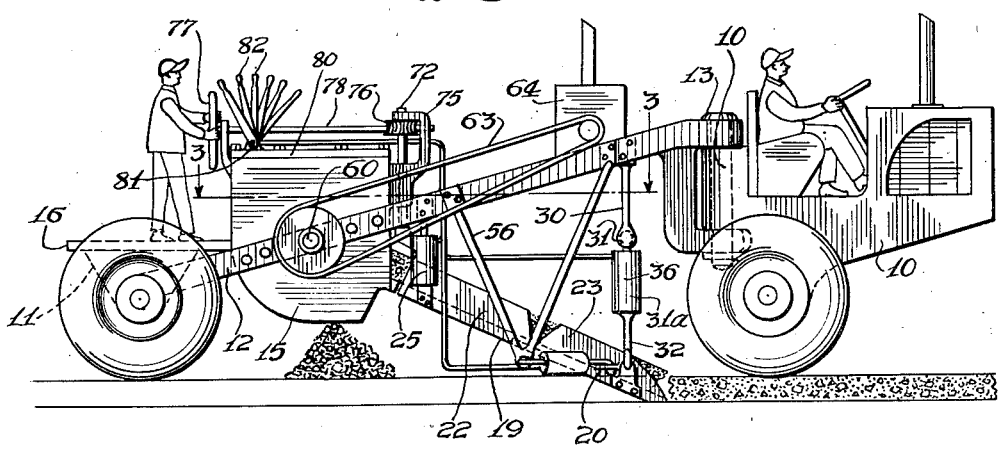
Fig. 1
INVENTOR:
Ayers B. Putnam
BY
Miles B. Stevens & Co.
Attorneys.

Oct. 30, 1956 A. B. PUTNAM 2,768,794
ROTARY BEATER BREAKING MILL FOR LOOSENED PAVEMENT SLAB
Filed April 24, 1951 2 Sheets-Sheet 2

INVENTOR.
Ayers B. Putnam
BY
Milo B. Stevens & Co.
Attorneys.

United States Patent Office 2,768,794
Patented Oct. 30, 1956

2,768,794

ROTARY BEATER BREAKING MILL FOR LOOSENED PAVEMENT SLAB

Ayers B. Putnam, Chicago, Ill.

Application April 24, 1951, Serial No. 222,652

2 Claims. (Cl. 241—186)

My invention relates to the removal and processing of old pavement slabs after they have been loosened from the ground or other foundation. Ordinarily, a crane and frost ball, or an air-driven piston hammer is employed to break up the slabs. The broken material is then picked up by a power shovel and transported to another place where it is processed through a rock crusher. The crushed material is then transported to the place of usage. The processing therefore involves two locations before the resulting material is transported to the place of use; also, the apparatus employed, first for crushing the slabs, and second for crushing the pieces, is in two units. Consequently, a considerable expense is involved in providing the two crushing units and suitable transportation for the slab pieces to the point where they are crushed to the smaller size. It is therefore one object of the present invention to provide an apparatus which accomplishes the entire operation at the site where the pavement slabs are found or located, saving transportation time and costs.

A further object is to provide a machine which picks up the pavement slabs and reduces them to the small size required at the site where the slabs are found and in a continuous operation.

Another object is to incorporate the improved apparatus in an automotive vehicle for facility in picking up the material and delivering it to the place of use with dispatch at a minimum of expense.

With the above objects in view, and any others which may suggest themselves from the description to follow, a better understanding of the invention may be had by reference to the accompanying drawings, in which—

Fig. 1 is a side elevation of the vehicle incorporating the novel apparatus, showing the latter in an operative position;

Fig. 2 is a top plan view of the showing in Fig. 1;

Fig. 5 is an enlarged section on the line 5—5 of Fig. 2.

Figure 4:
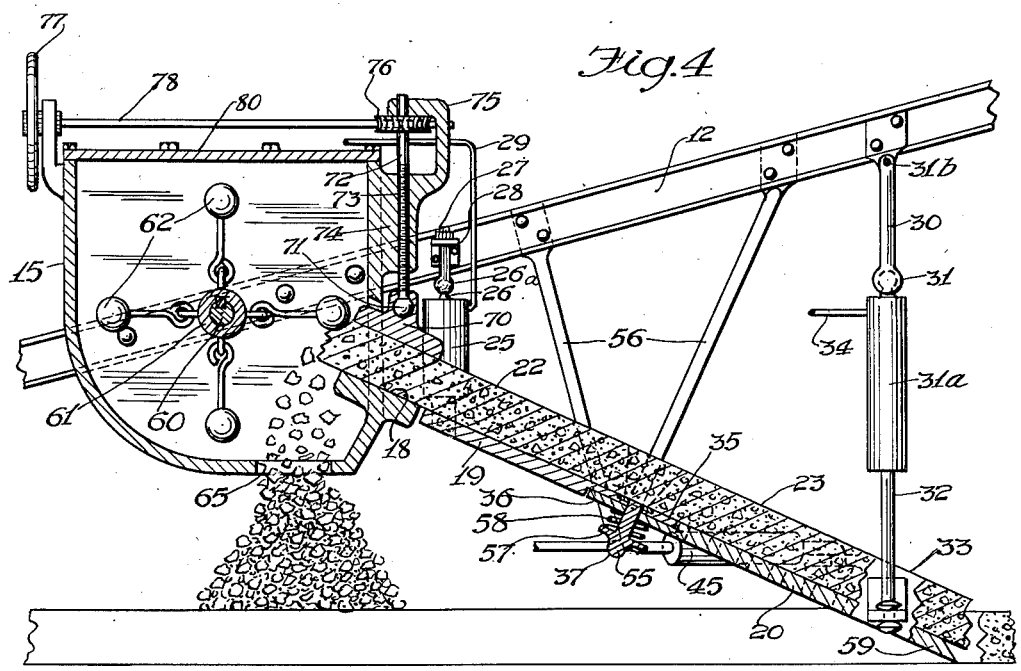
Fig. 4 is a section on the line 4—4 of Fig. 3.

In accordance with the foregoing, specific reference to the drawings indicates the vehicle for the novel apparatus in the form of a tractor 10 and a trailer 11, the frame 12 of the latter rising to join the tractor with a vertical pivot or king bolt 13. For the purpose of the present invention, the frame 12 of the trailer receives a housing 15 in its rear portion, the housing being extended rearwardly with a platform 16 for the operator of the slab mill. Fig. 4 shows that the housing is formed with a frontal entrance platform 18 from which an inclined chute 19 leads in forward direction; and the chute is supplemented or continued in the form of a shovel 20.

The chute 19 has side walls 22, while the shovel 20 has similar side walls 23. The rear portion of the chute 19 is supported on each side by a hydraulic type cylinder 25 containing the usual plunger (not shown) and rod 26; and the latter is secured by a swivel joint 26a to a bolt 27 suspended with freedom for lateral play in a bracket 28 carried by the corresponding side member of the frame 12 of the trailer. A fluid hose 29 leads to the upper end of each cylinder 25 for facility to raise the chute 19 or allow the same to fall by gravity by the use of a suitable control.

The lower portion of the shovel 20 receives lifting means similar to those employed for the chute 19. Thus, a rod 30 making a swivel joint 31 with a cylinder 31a is pivotally suspended at 31b from each side member of the trailer frame 12; and the plunger rod 32 of the cylinder extends in each case to make a swiveled or flexible connection 33 with the shovel 20. Again, a fluid hose 34 connects with the lower end of the cylinder 31a.

The chute 19 and shovel 20 join with overlapping tongues 35 and 36 on a pivot bolt 37 in order to permit the shovel to swing from side to side to a limited extent, the upper end of the bolt receiving a nut 38. Hydraulic means are also employed to procure this motion, and are more clearly illustrated in Fig. 3. It is seen here that each frame bar 12 receives a plate 40 on the outside from which extends a bracket 41. A universal pivoting connection 43 is made from this bracket with an arm 44 extended in rearward direction from a horizontal cylinder 45. The latter is similar to the other hydraulic cylinders; and its plunger rod 47 extends to make a pivoting connection 48 with an ear 50 projecting from the corresponding side of the shovel 20. Fluid hoses 51 and 52 are directed to the ends of the cylinder 45 in order to operate the plunger 47 in either direction for the corresponding control of the shovel.

The pivot 37 between the chute 19 and the shovel 20 is supported by a cross-bar 55 at the bottom of struts 56 depending from the frame bars 12. However, the pivot is not rigidly fitted with relation to the tongues 35 and 36, but carries a base 57 from which a compression spring 58 extends to the tongue 36. The tongues 35 and 36 are therefore floatingly supported on the pivot, allowing the changes in slope of the chute and shovel to be made without binding or other prejudice to the pivotal connection 37.

Figure 3:
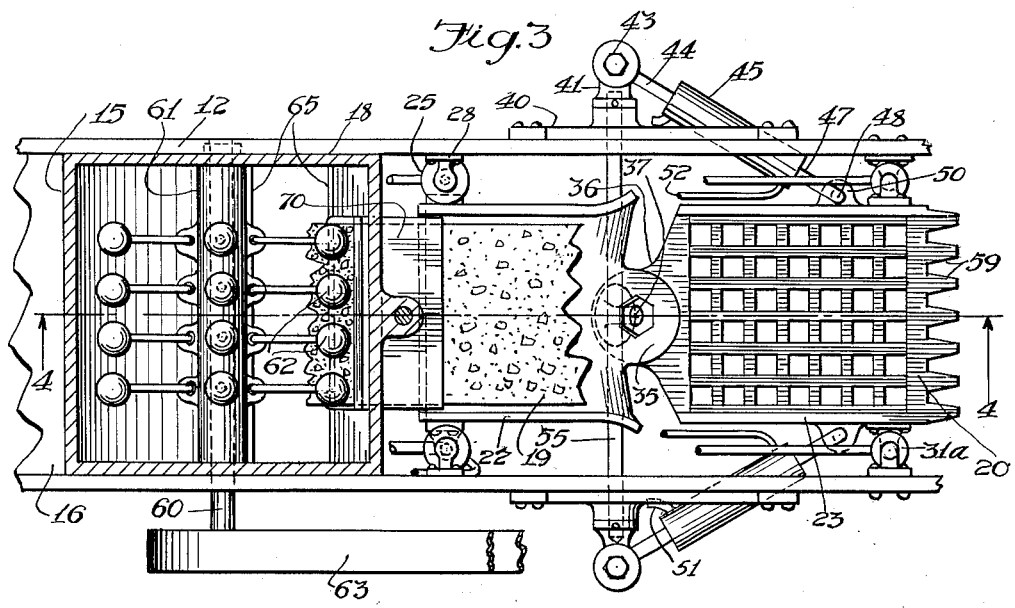
Fig. 3 is an enlarged section on the line 3—3 of Fig. 1.

As noted in Figs. 3 and 4, the shovel 20 is made in the form of a grid; and its forward end is in the form of a series of sharp blades 59. With the chute 19 and shovel 20 positioned approximately as shown, it is apparent that the advance of the vehicle with either smooth or jerking action will cause the shovel to pick up pieces or slabs of pavement in the manner indicated in Fig. 4. Generally, such pieces are anywhere from one to three feet in major dimension. However, being loose as they are picked up, the further advance of the vehicle will cause such pieces to back up along the shovel and chute as shown in the figure referred to. The entrance platform 18 guides the pieces or slabs into a receiving unit formed by the housing 15. The latter contains a breaking unit comprising a horizontal cross-shaft 60, a hub 61 carried by the same, and a cluster of beaters 62 linked to the shaft. Thus, with a belt 63 or other suitable drive from a power unit 64 carried by the trailer, the rapid motion of the beaters 62 will cause them to break or chip off small pieces of the slabs as these back into the housing, so that the pieces may fall through an opening 65 in the bottom of the housing to accumulate on the ground as the vehicle proceeds with the work.

It is necessary, when a slab backs up on the entrance platform 18, that it be held down while the beaters 62 inflict blows on the rear or projecting portion of the slab. For this purpose, a block 70 is provided over the entrance, such block making a swivel joint 71 with a vertical rod 72. The latter is formed as a screw 73 where it passes through a bearing 74 extended from the wall of the housing 15, so that the rotation of the rod 72 determines the height of the block 70. The bearing 74 is extended with a receptacle 75 affording a clearance for a worm gear 76 carried by the rod 72. A hand wheel 77 convenient to the occupant of the platform 16 transmits a control to the worm gear 76 by means of a shaft 78 and a worm 79, so that the operator may adjust the block 70 in the manner of a clamp on each slab as it backs onto the entrance platform 18, in order to aline the slab with the platform 18 and hold the slab down firmly while the beaters 62 engage the same. It is understood that the motion of the vehicle will be so controlled and maneuvered as to facilitate the feed of the pavement slabs along the shovel 20 and chute 19, and onto the platform 18 each time a new hold is to be taken on a slab by the clamp 70 and a suitable portion of the affected slab projected into the housing for working access by the beaters 62; and the height adjustment of the rear end of the chute facilitates the training of slabs of irregular thickness into the housing entrance.

Figs. 1 and 2 show that the array of hydraulic hoses or tubes necessary to operate the various cylindrical units previously referred to is grouped over the cover plate 80 of the housing for application to a suitable valve shaft 81 from which a series of levers 82 are projected for the control of the various hydraulic units. While it is possible to make limited changes in the slope of the chute 19 and shovel 20 for the most satisfactory guidance of the pavement slabs in the direction of the housing, it is often necessary to slide or jiggle the shovel in front in order to gain a hold on the pieces or slabs of pavement from underneath, and it is for this purpose that the hydraulic units 45 are provided.

It will now be apparent that the novel apparatus utilizes a vehicle of conventional form as a carrier and mover to scoop up the pavement pieces or slabs and secure their feed into the zone of breakage, the advance and maneuvering of the vehicle being largely relied upon to promote such feed. In addition, the hydraulic means to adjust the chute and shovel, as well as to vibrate the latter, insure the uninterrupted progress of the feed, so that no manual or external means are required to accomplish the same at any time. Further, when a given slab has found place in the entrance of the housing, a clamp is applicable to hold the same rigidly while a plurality of beaters break pieces off the slab portion projecting into the housing. Further, the pieces are broken into the small or required size in a single operation, so that they accumulate under the housing in readiness to be picked up and delivered to the place of use. Thus, the entire operation is accomplished by the combination of a motive unit which travels to any place where the slabs are located and includes means for picking up and crushing the same to the proper size for final use without processing at any other location.

While I have described the invention along specific lines, various minor changes or refinements may be made therein without departing from its principle, and I reserve the right to employ all such changes and refinements as may come within the scope and spirit of the appended claims.

I claim:

1. The combination with a chamber having a side entrance for the insertion of a pavement slab, a rotary breaker in the chamber for the leading portion of the slab, and a platform in said entrance for the support of said portion; of a flat-bottomed block carried by the chamber adjacent to said entrance and designed to hold said leading portion down, and means applied to the block at a medial point from above for adjusting the block to cause said leading portion to become alined with the platform.

2. The combination with a chamber having a side entrance for the insertion of a pavement slab, and a rotary breaker in the chamber for the leading portion of the slab; of a platform in said entrance slanting upwardly toward the inside of the chamber for the support of said portion at a corresponding angle, a flat-bottomed block adjacent to the entrance and designed to hold said leading portion down, and swivel joint means between the chamber and the block for the support and adjustment of the block to cause said leading portion to assume the angle of the platform.

References Cited in the file of this patent

UNITED STATES PATENTS

| 280,885 | Vaughan | July 10, 1883 |
| 305,711 | Phillips | Sept. 23, 1884 |
| 1,193,176 | Moore | Aug. 1, 1916 |
| 1,214,558 | Liggett | Feb. 6, 1917 |
| 1,462,096 | Wiertz | July 17, 1923 |
| 1,960,626 | Moore | May 29, 1934 |
| 2,335,515 | Jehle | Nov. 30, 1943 |
| 2,453,008 | Fowler | Nov. 2, 1948 |
| 2,585,224 | Campbell | Feb. 12, 1952 |

FOREIGN PATENTS

| 272,572 | Great Britain | June 20, 1927 |